(12) United States Patent
Goto et al.

(10) Patent No.: US 11,347,978 B2
(45) Date of Patent: May 31, 2022

(54) IMAGE PROCESSING APPARATUS, IMAGE PROCESSING METHOD, AND IMAGE PROCESSING SYSTEM

(71) Applicant: Sony Corporation, Tokyo (JP)

(72) Inventors: Shuichi Goto, Tokyo (JP); Keisuke Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 19 days.

(21) Appl. No.: 16/966,473

(22) PCT Filed: Dec. 11, 2018

(86) PCT No.: PCT/JP2018/045561
§ 371 (c)(1),
(2) Date: Jul. 31, 2020

(87) PCT Pub. No.: WO2019/155757
PCT Pub. Date: Aug. 15, 2019

(65) Prior Publication Data
US 2021/0049427 A1 Feb. 18, 2021

(30) Foreign Application Priority Data
Feb. 7, 2018 (JP) .............................. JP2018-019767

(51) Int. Cl.
*H04N 5/235* (2006.01)
*H04N 5/232* (2006.01)
(Continued)

(52) U.S. Cl.
CPC ......... *G06K 9/6293* (2013.01); *G06K 9/6289* (2013.01); *G06T 3/4038* (2013.01);
(Continued)

(58) Field of Classification Search
CPC ............. H04N 5/2258; H04N 5/23229; H04N 5/23245; H04N 5/2355; G06K 9/6289
See application file for complete search history.

(56) References Cited

U.S. PATENT DOCUMENTS

2014/0320602 A1* 10/2014 Govindarao ....... H04N 9/04515
348/46
2015/0116508 A1 4/2015 Ito et al.
(Continued)

FOREIGN PATENT DOCUMENTS

CN 105049718 A 11/2015
EP 2833618 2/2015
(Continued)

OTHER PUBLICATIONS

International Search Report and Written Opinion dated Jan. 29, 2019 for PCT/JP2018/045561 filed on Dec. 11, 2018, 15 pages including English Translation of the International Search Report.

*Primary Examiner* — Daniel M Pasiewicz
(74) *Attorney, Agent, or Firm* — Xsensus LLP

(57) ABSTRACT

To suppress a sense of strangeness caused by mode transition when images obtained from a plurality of image capturing devices are fused.
According to the present disclosure, it is provided an image processing apparatus including: a fusion processing unit that fuses a plurality of pieces of image information obtained from each of a plurality of image capturing devices that captures the same subject; and a fusion mode determination unit that determines a mode of the fusion in accordance with the value of a predetermined variable and sets, in accordance with each of a plurality of the modes, the threshold value of the variable for determining the mode.

9 Claims, 7 Drawing Sheets

(51) Int. Cl.
  *G06K 9/62* (2022.01)
  *G06T 3/40* (2006.01)
  *G06T 5/50* (2006.01)
  *H04N 5/225* (2006.01)

(52) U.S. Cl.
  CPC ............ *G06T 5/50* (2013.01); *H04N 5/2258* (2013.01); *H04N 5/2355* (2013.01); *H04N 5/23229* (2013.01); *H04N 5/23245* (2013.01)

(56) References Cited

U.S. PATENT DOCUMENTS

| | | | |
|---|---|---|---|
| 2016/0337587 A1* | 11/2016 | Chou | .................. H04N 5/265 |
| 2016/0344943 A1* | 11/2016 | Lee | .................. H04N 5/23235 |
| 2017/0090837 A1 | 3/2017 | Homma | |
| 2017/0150067 A1 | 5/2017 | Han | |
| 2021/0067689 A1* | 3/2021 | Watanabe | ................. G06T 5/50 |

FOREIGN PATENT DOCUMENTS

| | | |
|---|---|---|
| GB | 2541564 | 11/2016 |
| JP | 2007-267330 A | 10/2007 |
| JP | 2013-219525 A | 10/2013 |
| JP | 2014-143457 A | 8/2014 |
| JP | 2015-088824 A | 5/2015 |
| JP | 2019129446 A | 8/2019 |
| WO | 2018/092378 A1 | 5/2018 |
| WO | 2018/092379 A1 | 5/2018 |

* cited by examiner

FIG. 3

| FUSION (Fusion) STATE | MODE A (NO FUSION) | TRANSITION (LUMINANCE S/N CHANGE) | MODE B (COLOR IMAGE BASED) | TRANSITION (VIEWPOINT CHANGE, LUMINANCE AND COLOR SHADE CHANGE, S/N CHANGE) | MODE C (BLACK-AND-WHITE IMAGE BASED) |
|---|---|---|---|---|---|
| IMAGE QUALITY IMPROVEMENT EFFECT | S/N: — SENSE OF RESOLUTION: — | | S/N: SMALL SENSE OF RESOLUTION: EQUIVALENT TO MODE A | | S/N: LARGE SENSE OF RESOLUTION: LARGE |
| ARTIFACT OCCURRENCE RISK | NONE | | LOW | | HIGH |

IMAGE PROCESSING APPARATUS, IMAGE PROCESSING METHOD, AND IMAGE PROCESSING SYSTEM

CROSS-REFERENCE TO RELATED APPLICATIONS

The present application is based on PCT filing PCT/JP2018/045561, filed Dec. 11, 2018, which claims priority to JP 2018-019767, filed Feb. 7, 2018, the entire contents of each are incorporated herein by reference.

TECHNICAL FIELD

The present disclosure relates to an image processing apparatus, an image processing method, and an image processing system.

BACKGROUND ART

Conventionally, in information processing terminals such as a portable smartphone, the image performance of the image capturing unit is lower than that of a single-lens reflex camera or the like due to a demand for miniaturization and thinning. Thus, for example, Patent Document 1 described below describes that a captured image generated by a camera removable from an information processing terminal is supplied to the information processing terminal by wireless communication. Furthermore, Patent Document 2 described below describes that a plurality of image capturing units is provided to simultaneously generate a plurality of images having different image qualities, e.g., images having a first angle of view and a second angle of view narrower than the second angle of view.

CITATION LIST

Patent Document

Patent Document 1: Japanese Patent Application Laid-Open No. 2015-088824
Patent Document 2: Japanese Patent Application Laid-Open No. 2013-219525

SUMMARY OF THE INVENTION

Problems to be Solved by the Invention

As a method for enhancing the sensitivity of a digital camera or the like, there is a method for increasing the lens aperture or the cell size of an image capturing device. However, this method has a barrier in miniaturizing and thinning the image capturing device.

On the other hand, in a case of assuming that a high-sensitivity image is acquired by fusing a black-and-white image obtained from a high-sensitivity black-and-white image capturing device and a color image obtained from an image capturing device in a Bayer array, a difference occurs in a viewpoint position between a mode based on the black-and-white image and a mode based on the color image. Furthermore, in this case, in the mode based on the black-and-white image and the mode based on the color image, a difference occurs in luminance and color shade due to a difference in characteristics of the respective image capturing devices or the like. Accordingly, when the mode transitions, there is a possibility that the subject image visually recognized by the user changes and gives the user a sense of strangeness. In particular, in a case of capturing a moving image, if these modes transition in real time, there is a high possibility of giving to the user a sense of strangeness.

Therefore, it has been required to suppress a sense of strangeness caused by mode transition when images obtained from a plurality of image capturing devices are fused.

Solutions to Problems

According to the present disclosure, it is provided an image processing apparatus including: a fusion processing unit that fuses a plurality of pieces of image information obtained from each of a plurality of image capturing devices that captures the same subject; and a fusion mode determination unit that determines a mode of the fusion in accordance with the value of a predetermined variable and sets, in accordance with each of a plurality of the modes, a threshold value of the variable for determining the mode.

Furthermore, according to the present disclosure, it is provided an image processing method including: fusing a plurality of pieces of image information obtained from each of a plurality of image capturing devices that captures the same subject; and determining a mode of the fusion in accordance with the value of a predetermined variable and setting, in accordance with each of a plurality of the modes, the threshold value of the variable for determining the mode.

Furthermore, according to the present disclosure, it is provided an image processing system including: a first image capturing apparatus that captures a black-and-white image; a second image capturing apparatus that captures a color image; and an image processing apparatus including a fusion processing unit that fuses image information of the black-and-white image and image information of the color image, and a fusion mode determination unit that determines a mode of the fusion in accordance with a predetermined variable and sets, in accordance with each of a plurality of the modes, a threshold value of the variable for determining the mode.

Effects of the Invention

As described above, according to the present disclosure, it is possible to suppress a sense of strangeness caused by mode transition when images obtained from a plurality of image capturing devices are fused.

It is to be noted that the above effects are not necessarily restrictive, and any of the effects shown in the present description or other effects that can be understood from the present description may be achieved in addition to or in place of the above effects.

BRIEF DESCRIPTION OF DRAWINGS

FIG. 3 is a schematic diagram showing an effect (S/N ratio of luminance, sense of resolution) in a case where a black-and-white image and a color image are fused and the degree of failure of the fused image for each of mode A, mode B, and mode C.

MODE FOR CARRYING OUT THE INVENTION

Figure 1:
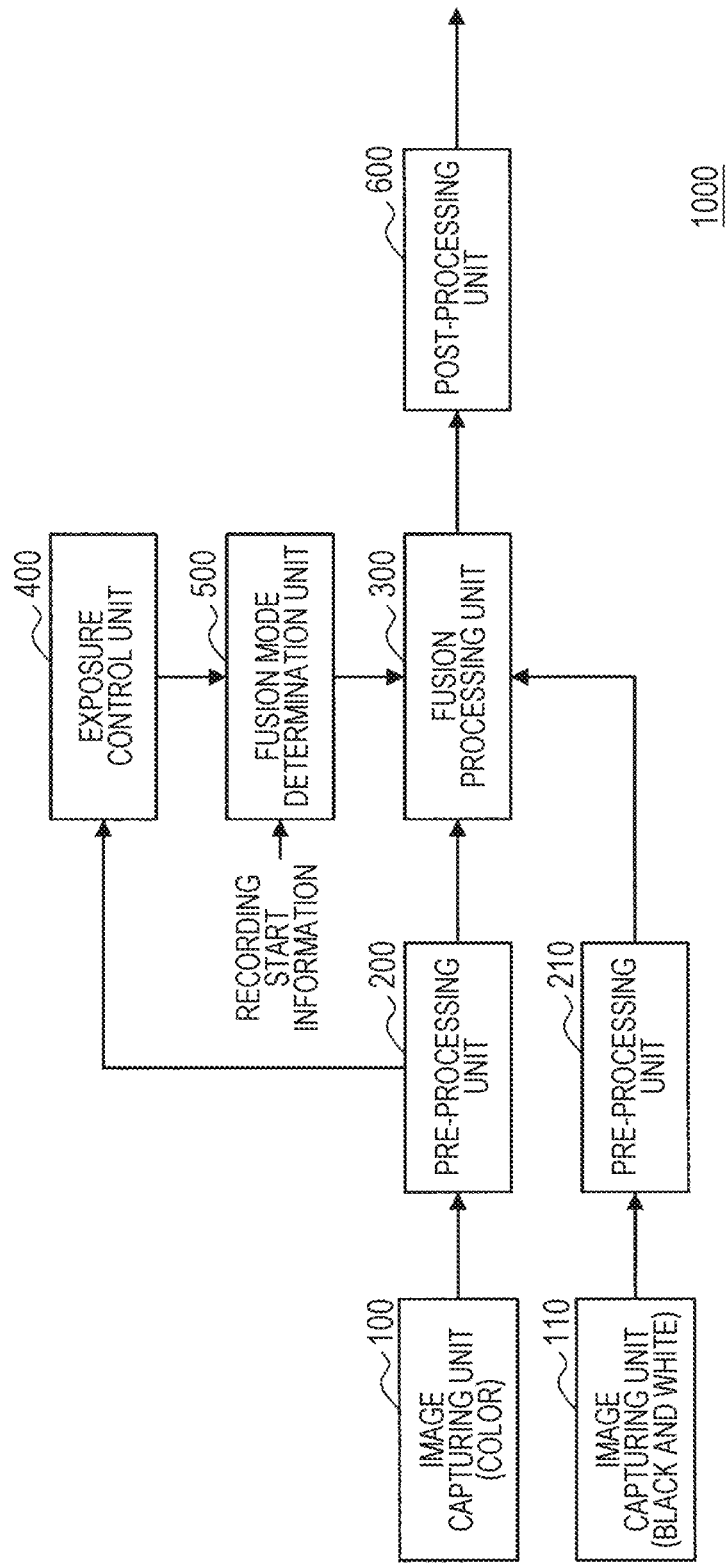
FIG. 1 is a schematic diagram showing a schematic configuration of an image capturing apparatus according to an embodiment of the present disclosure.

A preferred embodiment of the present disclosure will be described below in detail with reference to the accompanying drawings. It is to be noted that in the present description and drawings, components having substantially the same functional configuration are given the same reference numerals, and redundant description thereof is omitted.

It is to be noted that the description will be given in the following order.

1. Configuration Example of Image Processing Apparatus
2. Specific Example of Fusion Mode
3. Regarding Switching Threshold Value for Mode Transition
4. Regarding Other Parameters for Mode Transition
5. Configuration Example of Image Processing System
1. Configuration Example of Image Processing Apparatus First, a schematic configuration of an image processing apparatus (image capturing apparatus) 1000 according to an embodiment of the present disclosure will be described with reference to FIG. 1. The image processing apparatus 1000 is included in an image capturing apparatus such as a digital camera and an electronic apparatus such as a smartphone and a tablet terminal. The image processing apparatus 1000 has the two-lens image capturing units 100 and 110. Each of the image capturing units 100 and 110 includes an image capturing device and an optical system such as an optical lens. The optical system may include a zoom optical system and a focus optical system, and may change the zoom magnification and the focus position.

The image capturing device included in each of the image capturing unit 100 and the image capturing unit 110 is constituted of a CMOS image sensor and the like, and performs photoelectric conversion of light captured by a lens to generate image data of a captured image. The image capturing device of the image capturing unit 100 captures a color image. On the other hand, the image capturing device of the image capturing unit 110 captures a black-and-white (B/W) image. In the present embodiment, the image capturing unit 100 and the image capturing unit 110 can capture a still image and a moving image.

The image capturing device of the image capturing unit 100 that captures a color image uses a color filter of Bayer array. In the Bayer array, two pixels at diagonal positions are green (G) pixels in a pixel unit of 2×2 pixels, and the remaining pixels are a red (R) pixel and a blue (B) pixel. That is, the image capturing device of the image capturing unit 100 is constituted by color pixels, each pixel of which outputs an electric signal based on the incident light amount of any one color component of red, blue, and green, and generates image data of a color image in which each pixel indicates any of the three primary color (RGB) components. The image data of the Bayer array generates full-color image data by interpolating and generating pixels between the same colors by demosaic processing, and hence the substantial sense of resolution is deteriorated. In addition, artifacts such as moire and maze noise may be generated.

On the other hand, in the image capturing device of the image capturing unit 110, all pixels are constituted by white (W) pixels that output an electric signal based on the incident light amount in the entire wavelength region of visible light. Accordingly, the image capturing device of the image capturing unit 110 generates image data of a black-and-white image. In addition, since the image capturing device of the image capturing unit 110 is formed only of white (W) pixels, it is not required to perform demosaic processing, and it is possible to obtain image data having a higher sense of resolution and less artifacts than those by the image capturing device of the image capturing unit 100.

As described earlier, as a method for enhancing the sensitivity of a digital camera or the like, there is a method for increasing the lens aperture or the cell size of an image capturing device. However, this method has a barrier in miniaturizing and thinning the image capturing device. In order to enhance sensitivity while maintaining the miniaturization of the image capturing device, the image processing apparatus 1000 of the present embodiment fuses images by a plurality of cameras. Specifically, a black-and-white image obtained from the high-sensitivity black-and-white image capturing device and a color image obtained from the image capturing device in the Bayer array are fused to acquire a high-sensitivity image.

As shown in FIG. 1, the image processing apparatus 1000 includes, in addition to the two-lens image capturing units 100 and 110, a pre-processing units 200 and 210, a fusion processing unit 300, an exposure control unit 400, a fusion mode determination unit 500, and a post-processing unit 600.

The pre-processing unit 200 performs correction processing such as lens distortion correction and defective pixel correction on the image data of the color image captured by the image capturing unit 100. The pre-processing unit 200 outputs the corrected color image data to the fusion processing unit 300.

The pre-processing unit 210 performs correction processing such as lens distortion correction and defective pixel correction on the image data of the black-and-white image captured by the image capturing unit 110. The pre-processing unit 210 outputs the corrected black-and-white image data to the fusion processing unit 300.

The exposure control unit 400 not only performs overall exposure control of the image but also determines the ISO sensitivity on the basis of the brightness of the subject image and outputs it to the fusion mode determination unit 500. The ISO sensitivity is an index indicating the brightness of the subject image, and is an index indicating how much the image processing apparatus 1000 amplifies the light entering from the lenses of the image capturing units 100 and 110. For example, ISO 200 indicates that the sensitivity is twice as high as that of ISO100, and in a case of ISO 200, it is possible to obtain an image (photograph) of the same brightness even in a place where the amount of light is half that in a case of ISO 100.

Specifically, the exposure control unit 400 determines ISO sensitivity for capturing an image with proper exposure on the basis of the statistical information (detection value) obtained by the pre-processing unit 200. At this time, the ISO sensitivity is determined so that the darker the subject image is, the higher the ISO sensitivity becomes. The exposure control unit 400 can also determine the brightness of the subject image on the basis of the black-and-white image obtained from the image capturing unit 110, and determine the ISO sensitivity. In addition, the exposure control unit 400 can also determine shutter speed (F-number) for capturing an image with proper exposure on the basis of the statistical information (detection value) obtained by the pre-processing unit 200.

The fusion processing unit 300 fuses (integrates) the color image captured by the image capturing unit 100 and the black-and-white image captured by the image capturing unit 110. The fusion mode determination unit 500 changes a fusion mode on the basis of ISO sensitivity when the fusion processing unit 300 fuses the black-and-white image and the color image. The fusion processing unit 300 performs fusion processing of the color image and the black-and-white image on the basis of the fusion mode. When video recording is started at the time of capturing a stand-by moving image, the fusion mode determination unit 500 may fix the mode during video recording to the mode at the time of video recording start on the basis of information (video recording start information) indicating that video recording has been started.

2. Specific Example of Fusion Mode

Figure 2:
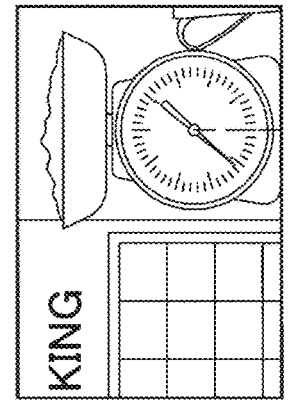
FIG. 2 is a schematic diagram showing an example of a fusion mode.

FIG. 2 is a schematic diagram showing an example of the fusion mode. FIG. 2 shows three modes of the mode A, the mode B, and the mode C. The mode A is a mode in which capturing an image is performed only by a single lens using an image capturing device in the Bayer array included in the image capturing unit 100. That is, in the mode A, fusion of the color image and the black-and-white image is not performed.

The mode B is a mode in which the S/N ratio of an image is improved by adding the luminance of a black-and-white image captured by the image capturing unit 100 having a high similarity to the color image on the basis of the color image captured by the image capturing unit 110. The mode C is a mode in which the S/N ratio of an image is improved by adding a color component of a color captured image on the basis of the luminance of a black-and-white image. For example, in a case where a dark subject is captured by the image capturing unit 100 and the image capturing unit 110, the S/N ratio of the black-and-white image captured by the image capturing unit 110 is better than that of the color image captured by the image capturing unit 100. Accordingly, use of the luminance of the black-and-white image allows the S/N ratio to be improved, and even a dark subject to be captured as a bright image.

In the present embodiment, on the basis of the ISO sensitivity determined by the exposure control unit 400, as the ISO sensitivity is larger, mode transition is performed such as the mode A→the mode B→the mode C. Even in a case where the luminance of the subject is low, the S/N ratio of the luminance can be improved by performing the fusion processing by the mode B and the mode C.

FIG. 3 is a schematic diagram showing an effect (S/N ratio, sense of resolution, and the degree of failure of the fused image) in a case where a color image and a black-and-white image are fused for each of mode A, mode B, and mode C. In a case where the subject is dark and the ISO sensitivity is increased, the image captured in the mode A becomes dark, and the S/N ratio and the sense of resolution decrease. In such a case, the S/N ratio and the sense of resolution can be improved by using the mode B and the mode C.

As shown in FIG. 3, in the mode B, the S/N ratio is improved as compared with the mode A, but the improvement effect is small. In addition, the mode B has the same sense of resolution as the mode A has. In addition, in the mode B, the degree of occurrence of image data errors and signal distortion (hereafter referred to as an artifact) is also small, and hence failure of the image hardly occurs.

The mode C is much larger in improvement effect on the S/N ratio than the mode B is. In addition, in the mode C, the sense of resolution is also improved as compared with the mode A. On the other hand, in the mode C, the degree of occurrence of an artifact is also increased, and the failure of an image becomes larger than that in the mode B. In addition, the mode C is based on the black-and-white image, a viewpoint movement corresponding to the parallax is generated with respect to the mode A and the mode B.

It is to be noted that the occurrence factors of artifacts include, for example, that the parallax between the color image and the black-and-white image is so large that the parallax exceeds the difference amount with which the both can be fused, that the fusion processing cannot be performed because there is no information regarding occlusion and a wrong color is fused, that the calculation of the position vector using the luminance information fails and the color is not fused at an appropriate position, and the like. In either case, a color difference occurs due to the occurrence of artifacts.

As described above, the mode C is high in the improvement effects of the S/N ratio and the sense of resolution, but the failure of the image also becomes large, and thus it can be said to be a high-risk, high-return mode. On the other hand, the mode B is low in the improvement effects of the S/N ratio and the sense of resolution, but the failure of the image is small, and thus it can be said to be a low-risk, low-return mode. In other words, the more the ISO sensitivity increases, the more the mode becomes high-risk, high-return.

Figure 4:
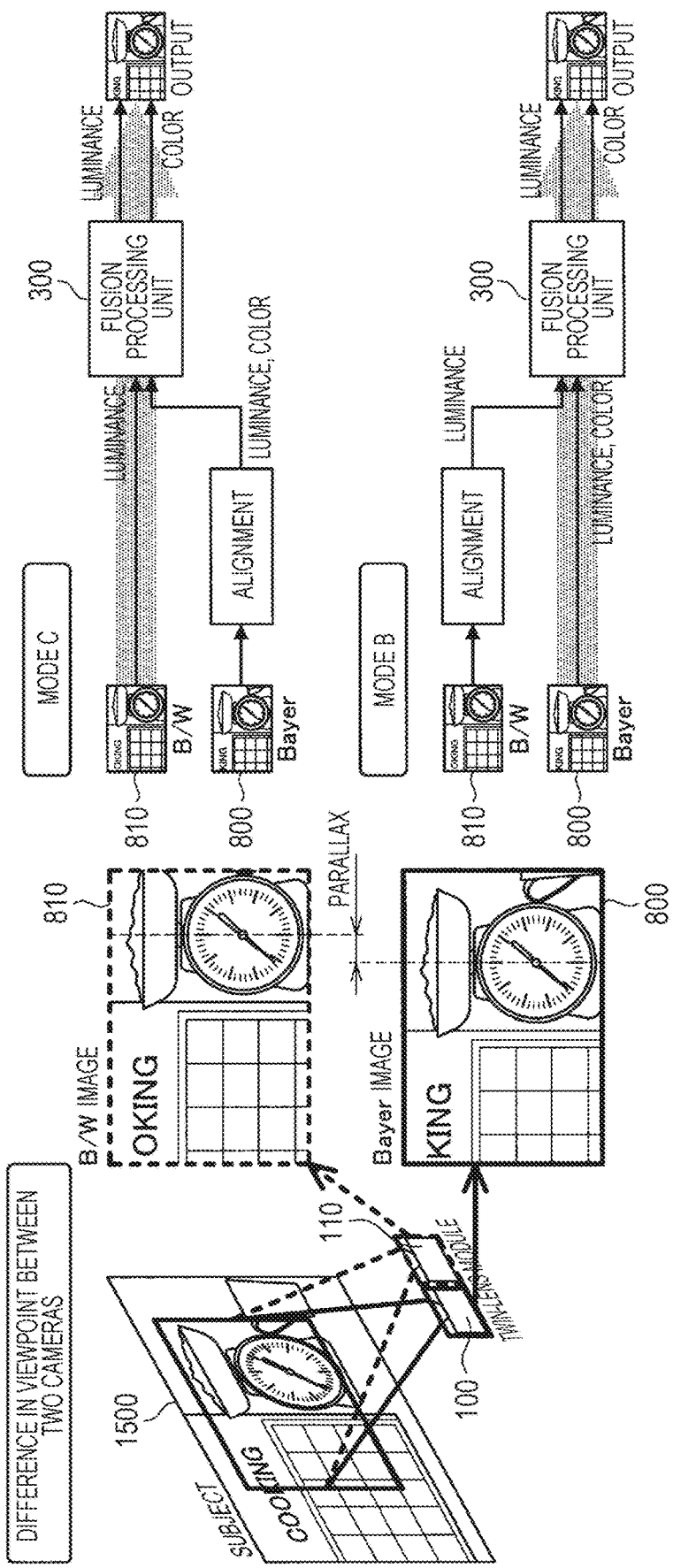
FIG. 4 is a schematic diagram showing alignment processing performed in the mode B and the mode C.

FIG. 4 is a schematic diagram showing the alignment processing performed in the mode B and the mode C. When an image of a subject 1500 shown in FIG. 4 is captured, the positions of the image capturing unit 100 and the image capturing unit 110 constituting a two-lens module do not fully coincide with each other. Therefore, parallax occurs between a black-and-white image 810 and a color image 800. In the mode B, the position of the black-and-white image 810 is aligned to the color image 800 on the basis of the color image 800. In the mode C, on the other hand, the position of the color image 800 is aligned to the black-and-white image on the basis of the black-and-white image 810. Therefore, when the mode transitions between the mode B and the mode C, the position of the viewpoint is moved by the amount of the parallax. The fusion processing unit 300 performs fusion processing for the color image and the black-and-white image having been aligned.

Figure 5:
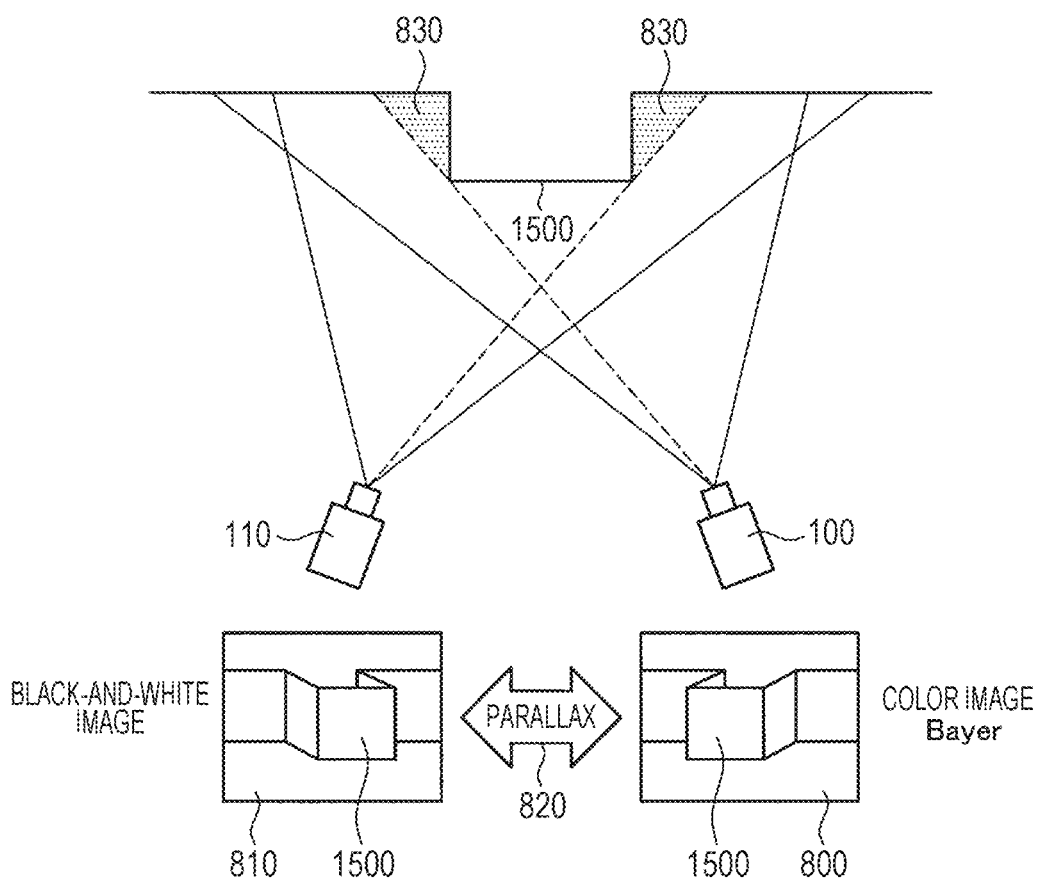
FIG. 5 is a schematic diagram showing parallax and occlusion between a color image and a black-and-white image due to a difference in position between an image capturing unit 100 and an image capturing unit 110.

FIG. 5 is a schematic diagram showing parallax 820 and occlusion 830 between the color image 800 and the black-and-white image 810 due to the difference in position between the image capturing unit 100 and the image capturing unit 110. It is to be noted that the upper part of FIG. 5 shows the image capturing unit 100, the image capturing unit 110, and the subject 1500 viewed from above.

As shown in FIG. 5, in a case where an image of the subject 1500 is captured by the image capturing unit 100 and the image capturing unit 110, what are seen by the image capturing unit 100 and the image capturing unit 110 are different from each other, and the parallax 820 and the occlusion 830 occur. The amounts of the parallax 820 and the occlusion 830 change in accordance with the distance from the image capturing units 100 and 110 to the subject 1500. The amounts of the parallax 820 and the occlusion 830 decrease as the distance to the subject 1500 becomes longer, and increase as the distance to the subject 1500 becomes shorter.

As described above, in the present embodiment, the mode transitions on the basis of the ISO sensitivity set in accordance with the brightness of the subject 1500. On the other hand, when transition is performed between the mode A or the mode B and the mode C, a change in the viewpoint occurs because the position is based on the color image 800 in the mode A and the mode B, and the position is based on the black-and-white image 810 in the mode C.

In addition, when transition is performed between the mode A or the mode B and the mode C, a change in color shade and a change in luminance due to a spectral sensitivity difference between the image capturing device of the image capturing unit 100 and the image capturing device of the image capturing unit 110 occur. Furthermore, when transition is performed between the mode A or the mode B and the mode C, a difference occurs in the S/N ratio of the luminance.

More specifically, in the mode B, since the luminance of the black-and-white image is added on the basis of the color of the color image, a difference between the luminance and the color is unlikely to occur. On the other hand, in the mode C, since the color of the color image is put on the basis of the luminance of the black-and-white image, a color difference with respect to the luminance may occur. Accordingly, when transition is performed between the mode B and the mode C, the luminance and color shade may change or the S/N may change. Accordingly, there is a possibility that the artifact will be conspicuous due to the mode transition. FIG. 3 shows that when transition is performed between the mode B and mode C, a change in viewpoint, a change in luminance and color shade, and a change in S/N ratio occur. Similarly, also in a case where transition is performed between the mode A and the mode B, the luminance and the S/N ratio change.

As described above, at the time of mode transition, changes visually perceivable by the user, such as viewpoint movement, the angle of view, exposure, color shade, resolution, a sense of resolution, and noise, occur. Then, when these changes occur at the time of the mode transition, the user may have a sense of strangeness. In particular, when the ISO sensitivity defined on the basis of the brightness of the subject 1500 is near the boundary where two modes are switched, the mode is frequently switched between the two modes in accordance with a slight change in the brightness of the subject 1500, and there is a possibility that the user has a large sense of strangeness.

In addition, these changes perceived by the user become noticeable particularly in a case where the user visually recognizes the moving image. When the mode is switched while the user is viewing the moving image, a change in viewpoint, a change in luminance and color shade, and a change in S/N ratio occur in real time, thereby giving a sense of strangeness to the user visually recognizing the moving image.

3. Regarding Switching Threshold Value for Mode Transition

In the present embodiment, when the mode is transitioned on the basis of the ISO sensitivity, the threshold value for determining the mode is set in accordance with each mode. More specifically, the threshold value of the ISO sensitivity for mode transition is set to a value different between a case where the ISO sensitivity increases and a case where the ISO sensitivity decreases, and in a case where the ISO sensitivity is a value near the boundary of mode switching, frequent switching of the mode is suppressed.

Figure 6:
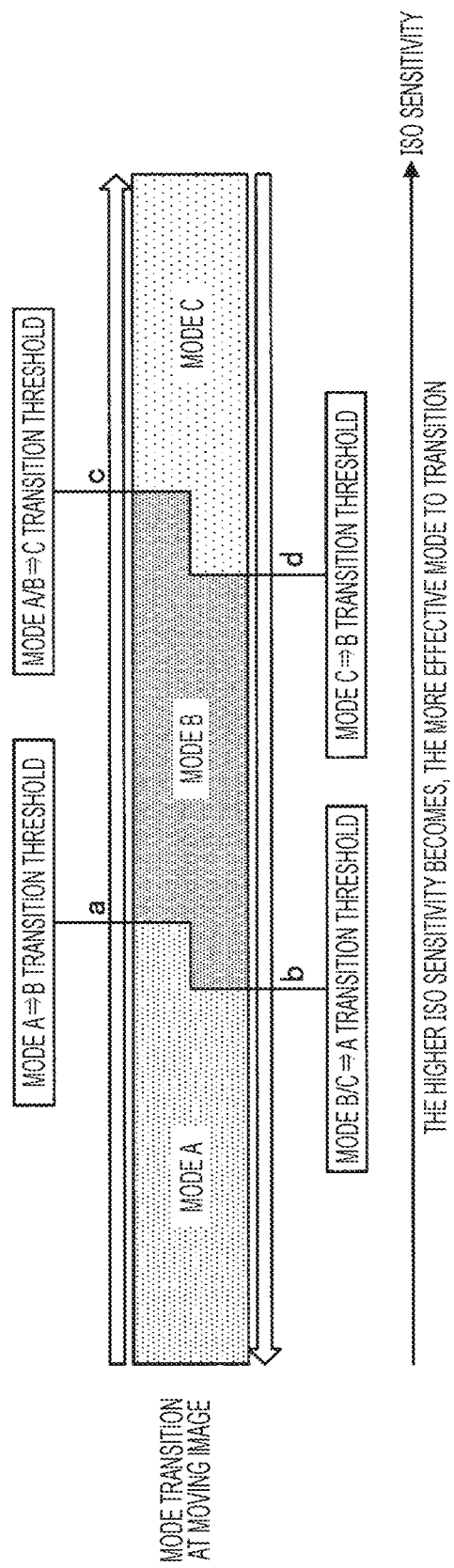
FIG. 6 is a schematic diagram showing mode transition in accordance with ISO sensitivity.

FIG. 6 is a schematic diagram showing mode transition in accordance with ISO sensitivity. As shown in FIG. 6, in a case where the ISO sensitivity increases, a threshold value a of the ISO sensitivity at the time of transitioning from the mode A to the mode B and a threshold value c of the ISO sensitivity at the time of transitioning from the mode A or the mode B to the mode C are set. When the ISO sensitivity becomes larger than the threshold value a, the transition from the mode A to the mode B is performed. In addition, when the ISO sensitivity becomes larger than the threshold value c, the transition from the mode A or B to the mode C is performed.

In addition, in a case where the ISO sensitivity decreases, a threshold value d of the ISO sensitivity at the time of transitioning from the mode C to the mode B and a threshold value b of the ISO sensitivity at the time of transitioning from the mode B or C to the mode A are set. When the ISO sensitivity becomes smaller than the threshold value d, the transition from the mode C to the mode B is performed. In addition, when the ISO sensitivity becomes smaller than the threshold value b, the transition from the mode B or C to the mode A is performed.

As shown in FIG. 6, the threshold value a of the ISO sensitivity at the time of transitioning from the mode A to the mode B is larger than the threshold value b in a case of transitioning from the mode B or C to the mode A. In addition, the threshold value c of the ISO sensitivity at the time of transitioning from the mode A or B to the mode C is larger than the threshold value d in a case of transitioning from the mode C to the mode B. These threshold values are individually set for each of the modes A, B, and C at the boundary of the ISO sensitivity at both ends of the modes A, B, and C. That is, when the mode is transitioned on the basis of the ISO sensitivity, the threshold value for determining the mode is set in accordance with each mode.

As described above, in the present embodiment, the threshold value of the ISO sensitivity at the time of switching the mode is set to a value different between the case where the ISO sensitivity increases and the case where it decreases. If the threshold value of the ISO sensitivity at the time of switching the modes is set to be the same for the case where the ISO sensitivity increases and the case where it decreases, in a case where the ISO sensitivity determined on the basis of the luminance of the subject is near the threshold value of switching between the mode B and the mode C for example, there is a possibility that the transition between the mode B and the mode C is frequently performed in accordance with the increase or decrease of the ISO sensitivity. In other words, in a case where the mode transition is performed in accordance with a modulation axis (ISO sensitivity) depending on the image capturing environment, the transition accompanied by a change visually perceivable by the user may be frequently repeated near the switching threshold value of the modulation. In this case, as described above for example, when the mode transitions between the mode B and the mode C, a viewpoint change, a luminance change, a color shade change, a change in the S/N ratio, and the like occur, thereby giving the user a sense of strangeness.

According to the present embodiment, since the threshold value of the ISO sensitivity at the time of switching the mode is set to a value different between the case where the ISO sensitivity increases and the case where it decreases, the mode can be determined by hysteresis control. Thus, even if the ISO sensitivity is a value near the boundary of mode transition, it is possible to suppress the mode from frequently switching, and it is possible to suppress giving the user a sense of strangeness.

4. Regarding Other Parameters for Mode Transition

While in the above example, the mode is switched on the basis of the ISO sensitivity, the mode can also be switched on the basis of other parameters depending on the image capturing environment. Other parameters include, for example, shutter speed, EV value, zoom position, focus position, and the like. By switching the modes A to C in accordance with these parameters, it is possible to output an optimum image in accordance with the values of the parameters from the image processing apparatus 1000. In addition, mode control may be performed by combining a plurality of parameters.

For example, by including a plurality of threshold values of mode transition by ISO sensitivity in accordance with the zoom position, the threshold value of the mode transition can be optimally set in accordance with the change in conspicuousness of image data errors and signal distortion (artifact) due to zooming.

5. Configuration Example of Image Processing System

Figure 7:
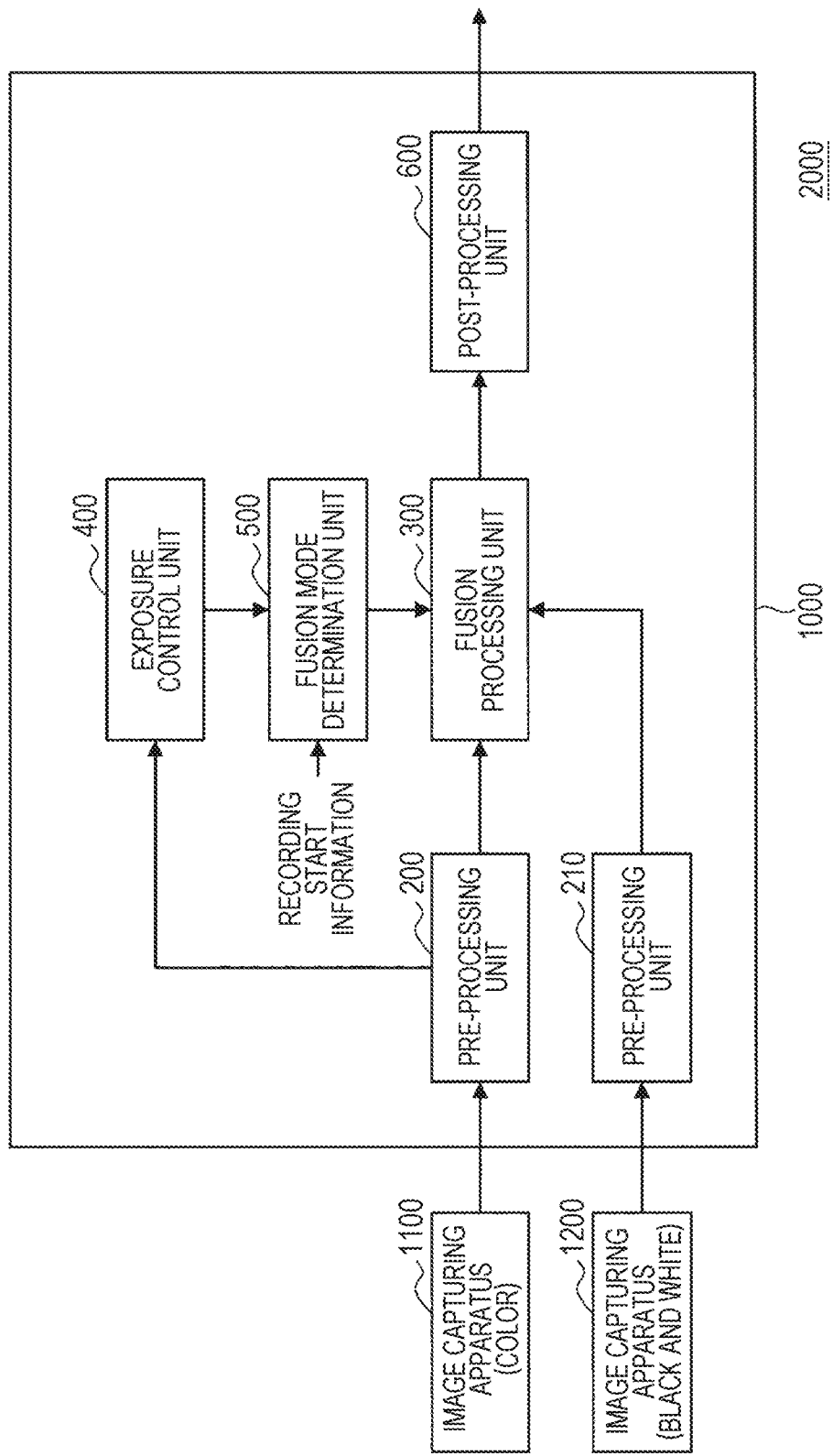
FIG. 7 is a schematic diagram showing the configuration of an image processing system in which an image capturing apparatus that captures a color image and an image capturing apparatus that captures a black-and-white image are configured separately from an image processing apparatus.

In the image processing apparatus 1000 shown in FIG. 1, the image capturing unit 100 and the image capturing unit 110 may be provided as an image capturing apparatus separate from the image processing apparatus 1000. FIG. 7 is a schematic diagram showing the configuration of an image processing system 2000 in which an image capturing apparatus 1100 that captures a color image and an image capturing apparatus 1200 that captures a black-and-white image are configured separately from the image processing apparatus 1000.

In FIG. 7, each of the image capturing apparatus 1100 and the image capturing apparatus 1200 is communicable with the image processing apparatus 1000 wirelessly or by wire. It is to be noted that for the communication method, any method can be adopted and is not particularly limited. As shown in FIG. 7, data of a color image captured by the image capturing apparatus 1100 is transmitted to the image processing apparatus 1000. In addition, data of a black-and-white image captured by the image capturing apparatus 1200 is transmitted to the image processing apparatus 1000. The processing in the image processing apparatus 1000 is performed similarly to the processing described with reference to FIG. 1.

As described above, according to the present embodiment, in a case where the mode transition is performed in accordance with a modulation axis (ISO sensitivity) depending on the image capturing environment, it is possible to suppress mode transition from frequently occurring by individually setting the switching threshold value of modulation in accordance with the state of mode. Specifically, since the threshold value of the ISO sensitivity at the time of switching the mode is set to a value different between the case where the ISO sensitivity increases and the case where it decreases, mode switching is not frequently performed, and it is possible to suppress a sense of strangeness to the user.

While the preferred embodiment of the present disclosure has been described in detail with reference to the accompanying drawings, the technical scope of the present disclosure is not limited to such an example. It is clear that a person ordinarily skilled in the art of the present disclosure can conceive of various modifications or variations within the scope of the technical idea set forth in the claims, and those modifications or variations are also understood to naturally fall within the technical scope of the present disclosure.

In addition, the effects described in the present description are merely illustrative or exemplary and not restrictive. That is, the technology according to the present disclosure can achieve other effects apparent to those skilled in the art from the description in the present description in addition to or in place of the above effects.

It is to be noted that the following configuration also falls within the technical scope of the present disclosure.

(1) An image processing apparatus including:
a fusion processing unit that fuses a plurality of pieces of image information obtained from each of a plurality of image capturing devices that captures the same subject; and
a fusion mode determination unit that determines a mode of the fusion in accordance with the value of a predetermined variable and sets, in accordance with each of a plurality of the modes, the threshold value of the variable for determining the mode.

(2) The image processing apparatus according to (1), in which the threshold value corresponding to a boundary where any mode and another mode are switched is different between a case where the variable increases and a case where the variable decreases.

(3) The image processing apparatus according to (1) or (2), in which the fusion processing unit fuses the image information of a black-and-white image and the image information of a color image.

(4) The image processing apparatus according to any of (1) to (3), in which a plurality of the image capturing devices captures a moving image of the subject.

(5) The image processing apparatus according to any of (1) to (4), in which the predetermined variable is a variable related to an environment at the time of capturing an image of the subject.

(6) The image processing apparatus according to any of (1) to (5), in which the predetermined variable is ISO sensitivity, shutter speed, EV value, zoom magnification, or focus position.

(7) The image processing apparatus according to (3), in which the mode includes a first mode in which the color image is output from the fusion processing unit without fusing the color image and the black-and-white image, a second mode in which information of the black-and-white image is fused to information of the color image on the basis of the color image, and a third mode in which information of the color image is fused to information of the black-and-white image on the basis of the black-and-white image.

(8) The image processing apparatus according to (7), in which in the second mode, luminance information of the black-and-white image is fused to information of the color image.

(9) The image processing apparatus according to (7) or (8), in which in the third mode, color information of the color image is fused to information of the black-and-white image.

(10) The image processing apparatus according to any of (1) to (9), in which when video recording is started at a time of capturing a stand-by moving image, the fusion mode determination unit fixes to the mode at the time of starting video recording.

(11) An image processing method including:
fusing a plurality of pieces of image information obtained from each of a plurality of image capturing devices that captures the same subject; and
determining a mode of the fusion in accordance with the value of a predetermined variable and setting, in accordance with each of a plurality of the modes, the threshold value of the variable for determining the mode.

(12) An image processing system including:
a first image capturing apparatus that captures a black-and-white image;
a second image capturing apparatus that captures a color image; and
an image processing apparatus including a fusion processing unit that fuses image information of the black-and-white image and image information of the color image, and a fusion mode determination unit that determines a mode of the fusion in accordance with a predetermined variable and sets, in accordance with each of a plurality of the modes, a threshold value of the variable for determining the mode.

REFERENCE SIGNS LIST

1000 Image capturing apparatus
100, 110 Image capturing unit
300 Fusion processing unit
500 Fusion mode determination unit

The invention claimed is:

1. An image processing apparatus comprising:
fusion processing circuitry that fuses a plurality of pieces of image information obtained from each of a plurality of image capturing devices that captures a same subject; and
fusion mode determination circuitry that changes a mode of a plurality of modes to another mode of the plurality of modes in accordance with first through fourth predetermined ISO sensitivity thresholds,
wherein the plurality of the modes includes:
a first mode in which the color image is output from the fusion processing circuitry without fusing the color image and the black-and-white image,
a second mode in which information of the black-and-white image is fused to information of the color image on a basis of the color image, and
a third mode in which information of the color image is fused to information of the black-and-white image on a basis of the black-and-white image,
wherein a transition from the first mode to the second mode occurs in accordance with a first increase in ISO sensitivity based on the first predetermined ISO sensitivity threshold,
wherein a transition from the second mode to the third mode occurs a second increase in ISO sensitivity based on the second predetermined ISO sensitivity threshold higher than the first predetermined ISO sensitivity threshold,
wherein a transition from the third mode to the second mode occurs in accordance with a first decrease in ISO sensitivity based on the third predetermined ISO sensitivity threshold lower than the second predetermined ISO sensitivity threshold and higher than the first predetermined ISO sensitivity threshold,
wherein a transition from the second mode to the first mode occurs in accordance with a second decrease in ISO sensitivity based on the fourth predetermined ISO sensitivity threshold which is lower than the first predetermined ISO sensitivity threshold.

2. The image processing apparatus according to claim 1, wherein the threshold value corresponds to a boundary where any mode and another mode are switched is different between a case where the variable increases and a case where the variable decreases.

3. The image processing apparatus according to claim 1, wherein the plurality of the image capturing devices that capture a moving image of the subject.

4. The image processing apparatus according to claim 1, wherein the fusion mode determination circuit that changes the mode of the plurality of modes to the another mode of the plurality of modes in accordance with art least one of:
first through fourth predetermined shutter speed thresholds,
first through fourth predetermined exposure value (EV) value thresholds,
first through fourth predetermined focus position thresholds, or
first through fourth predetermined shutter speed thresholds.

5. The image processing apparatus according to claim 1, wherein in the second mode, luminance information of the black-and-white image is fused to information of the color image.

6. The image processing apparatus according to claim 1, wherein in the third mode, color information of the color image is fused to information of the black-and-white image.

7. The image processing apparatus according to claim 1, wherein when video recording is started at a time of capturing a stand-by moving image, the fusion mode determination circuity fixes to the mode at a time of starting video recording.

8. An image processing method performed by a image processing apparatus, the method comprising:
obtaining a plurality of pieces of image information obtained from each of a plurality of image capturing devices that captures a same subject; and
fusing the plurality of pieces of image information, the fusing comprising changing a mode of a plurality of modes to another mode of the plurality of modes in accordance with first through fourth predetermined ISO sensitivity thresholds,
wherein the plurality of the modes includes:
a first mode in which the color image is output from the fusion processing circuitry without fusing the color image and the black-and-white image,
a second mode in which information of the black-and-white image is fused to information of the color image on a basis of the color image, and
a third mode in which information of the color image is fused to information of the black-and-white image on a basis of the black-and-white image,
wherein a transition from the first mode to the second mode occurs in accordance with a first increase in ISO sensitivity based on the first predetermined ISO sensitivity threshold,
wherein a transition from the second mode to the third mode occurs a second increase in ISO sensitivity based on the second predetermined ISO sensitivity threshold higher than the first predetermined ISO sensitivity threshold,
wherein a transition from the third mode to the second mode occurs in accordance with a first decrease in ISO sensitivity based on the third predetermined ISO sensitivity threshold lower than the second predetermined ISO sensitivity threshold and higher than the first predetermined ISO sensitivity threshold,
wherein a transition from the second mode to the first mode occurs in accordance with a second decrease in ISO sensitivity based on the fourth predetermined ISO sensitivity threshold which is lower than the first predetermined ISO sensitivity threshold.

9. An image processing system comprising:
a first image capturing apparatus that captures a black-and-white image;

a second image capturing apparatus that captures a color image; and
an image processing apparatus including:
: fusion processing circuity that fuses image information of the black-and-white image and image information of the color image, and
: fusion mode determination circuitry that changes a mode of a plurality of modes to another mode of the plurality of modes in accordance with first through fourth predetermined ISO sensitivity thresholds,
wherein the plurality of the modes includes:
: a first mode in which the color image is output from the fusion processing circuity without fusing the color image and the black-and-white image,
: a second mode in which information of the black-and-white image is fused to information of the color image on a basis of the color image, and
: a third mode in which information of the color image is fused to information of the black-and-white image on a basis of the black-and-white image,
wherein a transition from the first mode to the second mode occurs in accordance with a first increase in ISO sensitivity based on the first predetermined ISO sensitivity threshold,
wherein a transition from the second mode to the third mode occurs a second increase in ISO sensitivity based on the second predetermined ISO sensitivity threshold higher than the first predetermined ISO sensitivity threshold,
wherein a transition from the third mode to the second mode occurs in accordance with a first decrease in ISO sensitivity based on the third predetermined ISO sensitivity threshold lower than the second predetermined ISO sensitivity threshold and higher than the first predetermined ISO sensitivity threshold,
wherein a transition from the second mode to the first mode occurs in accordance with a second decrease in ISO sensitivity based on the fourth predetermined ISO sensitivity threshold which is lower than the first predetermined ISO sensitivity threshold.

* * * * *